(12) United States Patent
Deng

(10) Patent No.: US 11,531,814 B2
(45) Date of Patent: Dec. 20, 2022

(54) METHOD AND DEVICE FOR GENERATING MODIFIED STATEMENT

(71) Applicant: Beijing Bytedance Network Technology Co., Ltd., Beijing (CN)

(72) Inventor: Jiangdong Deng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/981,257

(22) PCT Filed: Nov. 16, 2018

(86) PCT No.: PCT/CN2018/115953
§ 371 (c)(1),
(2) Date: Sep. 15, 2020

(87) PCT Pub. No.: WO2020/052060
PCT Pub. Date: Mar. 19, 2020

(65) Prior Publication Data
US 2021/0192138 A1    Jun. 24, 2021

(30) Foreign Application Priority Data

Sep. 14, 2018  (CN) .......................... 201811074035.4

(51) Int. Cl.
*G06F 40/289* (2020.01)
*G06F 40/232* (2020.01)
*G06F 40/216* (2020.01)

(52) U.S. Cl.
CPC .......... *G06F 40/289* (2020.01); *G06F 40/216* (2020.01); *G06F 40/232* (2020.01)

(58) Field of Classification Search
CPC ..... G06F 40/289; G06F 40/216; G06F 40/232
(Continued)

(56) References Cited

U.S. PATENT DOCUMENTS 5,572,423 A * 11/1996 Church ................. G06F 40/232
715/260
9,471,566 B1 * 10/2016 Zhang ................... G06F 3/0237
(Continued)

FOREIGN PATENT DOCUMENTS

CN        1387650 A    12/2002
CN      103914444 A     7/2014
(Continued)

OTHER PUBLICATIONS

International Patent Application No. PCT/CN2018/115953; Int'l Search Report; dated Jun. 13, 2019; 2 pages.

*Primary Examiner* — Edwin S Leland, III
(74) *Attorney, Agent, or Firm* — BakerHostetler

(57) ABSTRACT

A method and a device for generating a modified statement are provided. An embodiment thereof includes obtaining a target statement, and separating words in the target statement to obtain a word collection to be modified; determining whether a target storage portion comprises a predetermined word collection to be confirmed corresponding to a word to be modified in the word collection to be modified; in response to determine to include the predetermined word collection, based on the error probabilities and the usage probabilities of the words to be confirmed, determining modification probabilities of the words to be confirmed; according to a numerical sequence of the modification probabilities, selecting predetermined numbered words to be confirmed from the word collection to be confirmed as a word sub-collection to be confirmed; and based on the word sub-collection to be confirmed, generating the modified statement. The embodiment improves the accuracy to modify the statement.

20 Claims, 5 Drawing Sheets

(58) Field of Classification Search
USPC .................................................................. 704/9
See application file for complete search history.

(56) References Cited

U.S. PATENT DOCUMENTS

| | | | | |
|---|---|---|---|---|
| 2004/0167771 A1* | 8/2004 | Duan | ...................... | G06F 40/44 |
| | | | | 704/10 |
| 2005/0086590 A1* | 4/2005 | Lee | ........................ | G06F 40/53 |
| | | | | 715/256 |
| 2008/0167872 A1* | 7/2008 | Okimoto | ................ | G10L 15/22 |
| | | | | 704/E15.047 |
| 2008/0319738 A1* | 12/2008 | Liu | ...................... | G06F 40/284 |
| | | | | 704/10 |
| 2011/0166851 A1* | 7/2011 | LeBeau | ................ | G06F 3/0482 |
| | | | | 704/235 |
| 2011/0231183 A1* | 9/2011 | Yamamoto | ............ | G10L 15/197 |
| | | | | 704/9 |
| 2016/0179774 A1* | 6/2016 | McAteer | ............... | G06F 40/232 |
| | | | | 704/9 |
| 2016/0183271 A1* | 6/2016 | Zhou | .................... | H04W 40/22 |
| | | | | 370/315 |
| 2016/0253312 A1* | 9/2016 | Rhodes | ................. | G06F 40/274 |
| | | | | 704/9 |
| 2017/0374093 A1* | 12/2017 | Dhar | ................... | H04L 63/1433 |
| 2018/0173695 A1* | 6/2018 | Pino | ........................ | G06F 40/44 |
| 2019/0108257 A1* | 4/2019 | Lefebure | ............... | G10L 15/183 |
| 2021/0042470 A1* | 2/2021 | Deng | .................... | G06F 40/295 |
| 2021/0192138 A1* | 6/2021 | Deng | .................... | G06F 40/289 |

FOREIGN PATENT DOCUMENTS

| | | | | |
|---|---|---|---|---|
| CN | 105550173 A | 5/2016 | | |
| CN | 106250364 A | 12/2016 | | |
| CN | 106708893 A | 5/2017 | | |
| CN | 108304385 A | 7/2018 | | |
| CN | 108376129 A | 8/2018 | | |
| CN | 109325227 A * | 2/2019 | .......... | G06F 40/216 |
| WO | WO-2017084506 A1 * | 5/2017 | ............. | G06F 17/30 |

\* cited by examiner

METHOD AND DEVICE FOR GENERATING MODIFIED STATEMENT

CROSS-REFERENCE TO RELATED APPLICATION

The disclosure is the U.S. National Stage of International Application No. PCT/CN2018/115953, filed on Nov. 16, 2018, which claims the priority benefit of CN applications Ser. No. 201811074035.4, filed on Sep. 14, 2018, titled "METHOD AND DEVICE FOR GENERATING MODIFIED STATEMENT" whose Applicant is Beijing Bytedance Network Technology Co., Ltd., and the entirety of the above-mentioned patent application will be hereby incorporated by reference herein and made a part of this specification.

TECHNICAL FIELD

The disclosure relates to a computer technical field, and more particularly to a method and a device for generating a modified statement.

BACKGROUND

When people input characters (such as inputting search statements into a search engine, inputting comment statements, etc.) by using electronic equipment such as a mobile phone and a computer, the situation of character input errors usually occurs. At the moment, wrong characters need to be corrected. In the prior art, the search engine is generally used for correcting the search statements input by the user, and the corrected statements are displayed for the user to select.

SUMMARY

Embodiments of the disclosure provide a method and a device for generating a modified statement.

In a first aspect, an embodiment of the disclosure provides a method for generating a modified statement. The method includes obtaining a target statement, and separating words in the target statement to obtain a word collection to be modified; determining whether a target storage portion comprises a predetermined word collection to be confirmed corresponding to a word to be modified in the word collection to be modified; wherein words to be confirmed have error probabilities and usage probabilities; the usage probabilities are configured for indicating probabilities of the words to be confirmed incorrectly replaced by the word to be modified; the usage probabilities are configured for indicating probabilities of using the words to be confirmed; in response to determine to comprise the predetermined word collection, based on the error probabilities and the usage probabilities of the words to be confirmed, determining modification probabilities of the words to be confirmed; wherein the modification probabilities are configured for indicating probabilities of revising the word to be modified as the words to be confirmed; according to a numerical sequence of the modification probabilities, selecting predetermined numbered words to be confirmed from the word collection to be modified as a word sub-collection to be confirmed; and based on the word sub-collection to be confirmed, generating the modified statement.

In some embodiments, the target storage portion is a pre-established correlation chart; the pre-established correlation chart comprises the word to be modified and the word collection to be confirmed; the pre-established correlation chart is configured for indicating a corresponding relation of the word to be modified and the word collection to be confirmed; the correlation chart further comprises the error probabilities and the usage probabilities of the words to be confirmed.

In some embodiments, the error probabilities and the usage probabilities of the words to be confirmed are pre-obtained according to following steps of: with respect to a word to be confirmed in the word collection to be confirmed, determining a quantity of the word to be confirmed comprised in texts in a predetermined text sub-collection corresponding to the word to be confirmed as a first number; wherein the text sub-collection is a sub-collection of a predetermined text collection; determining a quantity of the word to be modified corresponding to the word to be confirmed comprised in the texts in the predetermined text sub-collection corresponding to the word to be confirmed as a second number; dividing the second number by a sum of the first number and the second number to obtain an error probability of the word to be confirmed; determining a quantity of the word to be confirmed in the predetermined text collection as a third number; and determining a ratio of the third number to a total number of words comprised in the texts in the predetermined text collection as a usage probability of the word to be confirmed.

In some embodiments, the process of based on the word sub-collection to be confirmed, generating the modified statement comprises: utilizing the words to be confirmed in the word sub-collection to be confirmed, generating at least one candidate modified statement, and obtaining confidence coefficients of candidate modified statements in the at least one candidate modified statement; and based on a numerical sequence of the confidence coefficients, selecting a candidate modified statement from the at least one modified statement as the modified statement.

In some embodiments, after determining whether a target storage portion comprises a predetermined word collection to be confirmed corresponding to a word to be modified in the word collection to be modified, the method further comprises: in response to determine that the target storage portion excludes the predetermined word collection to be confirmed corresponding to the word to be modified, determining pinyin of Chinese characters comprised in the word to be modified; based on the pinyin, obtaining at least one matching word suited the pinyin; and selecting predetermined numbered matching words from the at least one matching word as the word sub-collection to be confirmed.

In some embodiments, a matching word in the at least one matching word has a corresponding hot value; the hot value is configured for indicating a frequency of using the matching word; and the process of selecting predetermined numbered matching words from the at least one matching word as the word sub-collection to be confirmed comprises: according to a numerical sequence of hot values, selecting the predetermined numbered matching words from the at least one matching word as the word sub-collection to be confirmed.

In a second aspect, an embodiment of the disclosure provides a device for generating a modified statement. The device includes an obtaining unit, which is disposed to obtain a target statement, and separate words in the target statement to obtain a word collection to be modified; a selecting unit, which is disposed to determine whether a target storage portion comprises a predetermined word collection to be confirmed corresponding to a word to be modified in the word collection to be modified; wherein words to be confirmed have error probabilities and usage probabilities; the usage probabilities are configured for indicating probabilities of the words to be confirmed incorrectly replaced by the word to be modified; the usage probabilities are configured for indicating probabilities of using the words to be confirmed; in response to determine to comprise the predetermined word collection, based on the error probabilities and the usage probabilities of the words to be confirmed, determine modification probabilities of the words to be confirmed; wherein the modification probabilities are configured for indicating probabilities of revising the word to be modified as the words to be confirmed; according to a numerical sequence of the modification probabilities, select predetermined numbered words to be confirmed from the word collection to be confirmed as a word sub-collection to be confirmed; and a generating unit, which is disposed to generate the modified statement based on the word sub-collection to be confirmed.

In some embodiments, the target storage portion is a pre-established correlation chart; the pre-established correlation chart comprises the word to be modified and the word collection to be confirmed; the pre-established correlation chart is configured for indicating a corresponding relation of the word to be modified and the word collection to be confirmed; the correlation chart further comprises the error probabilities and the usage probabilities of the words to be confirmed.

In some embodiments, the error probabilities and the usage probabilities of the words to be confirmed are pre-obtained according to following steps of: with respect to a word to be confirmed in the word collection to be confirmed, determining a quantity of the word to be confirmed comprised in texts in a predetermined text sub-collection corresponding to the word to be confirmed as a first number; wherein the text sub-collection is a sub-collection of a predetermined text collection; determining a quantity of the word to be modified corresponding to the word to be confirmed comprised in the texts in the predetermined text sub-collection corresponding to the word to be confirmed as a second number; dividing the second number by a sum of the first number and the second number to obtain an error probability of the word to be confirmed; determining a quantity of the word to be confirmed in the predetermined text collection as a third number; and determining a ratio of the third number to a total number of words comprised in the texts in the predetermined text collection as a usage probability of the word to be confirmed.

In some embodiments, the generating unit comprises: a generating module, which is disposed to utilize the words to be confirmed in the word sub-collection to be confirmed, generate at least one candidate modified statement, and obtain confidence coefficients of candidate modified statements in the at least one candidate modified statement; and a selecting module, which is disposed to select a candidate modified statement from the at least one modified statement as the modified statement based on a numerical sequence of the confidence coefficients.

In some embodiments, the selecting unit comprises: a determining module, which is disposed to determine pinyin of Chinese characters comprised in the word to be modified in response to determine that the target storage portion excludes the predetermined word collection to be confirmed corresponding to the word to be modified; an obtaining module, which is disposed to obtain at least one matching word suited the pinyin based on the pinyin; and a selecting module, which is disposed to select predetermined numbered matching words from the at least one matching word as the word sub-collection to be confirmed.

In some embodiments, a matching word in the at least one matching word has a corresponding hot value; the hot value is configured for indicating a frequency of using the matching word; and the process of selecting module is further disposed to: according to a numerical sequence of hot values, select the predetermined numbered matching words from the at least one matching word as the word sub-collection to be confirmed.

In a third aspect, an embodiment of the disclosure provides a server. The server includes one or more processors and a storage device stored with one or more programs therein; and when the one or more programs are executed by the one or more processors, the one or more processors perform any method in the first aspect.

In a fourth aspect, an embodiment of the disclosure provides a computer readable medium, stored with a computer program therein. The computer program is executed by a processor to perform any method in the first aspect.

BRIEF DESCRIPTION OF THE DRAWINGS

According to the detailed description of unlimited embodiments with reference to figures as below, other features, objectives and advantages of the disclosure will be more obvious.

DETAILED DESCRIPTION

The present application will be further described in detail in combination with accompanying drawings and embodiments. It should be understood that specific embodiments described herein are only for the purpose of explanation of the relevant invention, rather than to limit the invention. It should also be noted that, for convenience of description, only portions related to the relevant invention are shown in the accompanying drawings.

It should be noted that, in the case of no conflict, the embodiments of the present application and features of the embodiments can be combined with each other. The present application will be described in detail below with reference to the accompanying drawings in combination with the embodiments.

Figure 1:
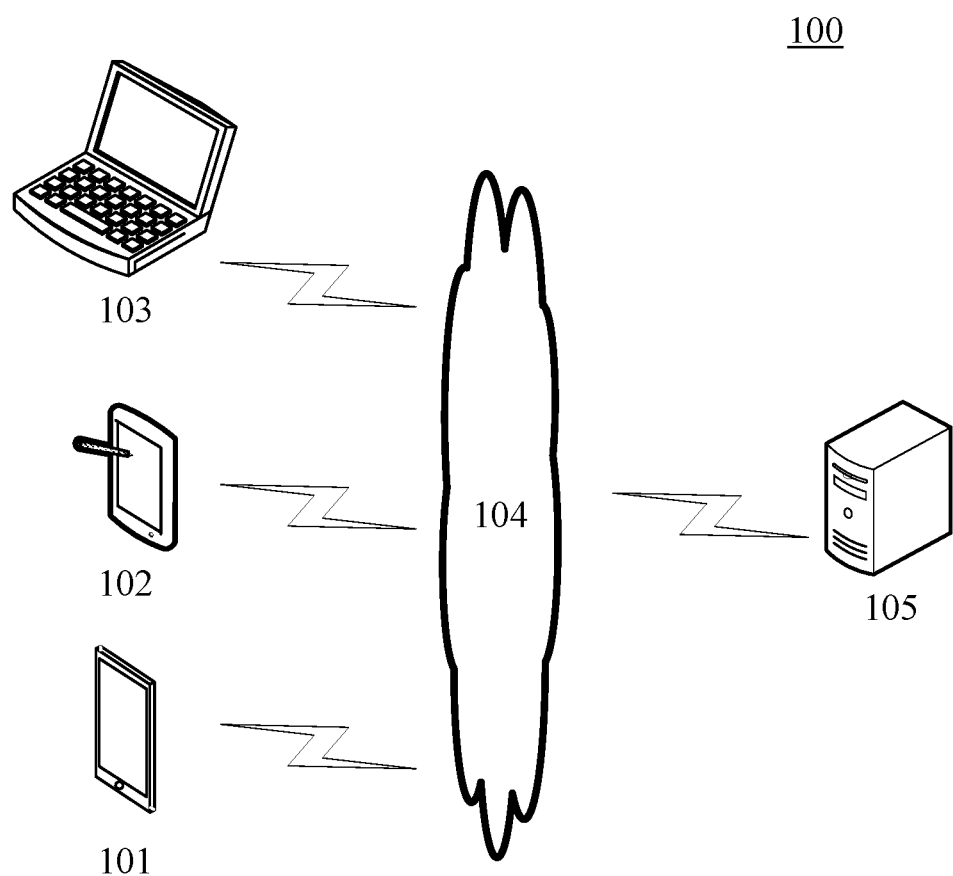
FIG. 1 is an exemplary system architecture diagram applied with an embodiment of the disclosure.

FIG. 1 shows an exemplary architecture 100 able to employ a method for separating words or a device for separating words of an embodiment of the disclosure.

As shown in FIG. 1, system architecture 100 may comprise terminal equipment 101, 102 and 103, a network 104 and a server 105. The network 104 is used for providing a medium of a communication link between the terminal equipment 101, 102 and 103 and the server 105. The network 104 may comprise various connection types, such as wired and wireless communication links or an optical fiber.

The terminal equipment 101, 102 and 103 interact with the server 105 via the network 104 to receive or send messages. Various client applications, such as web browser applications, shopping applications, and search applications, can be installed in the terminal equipment 101, 102 and 103.

The terminal equipment 101, 102 and 103 may be hardware or software. When being hardware, the terminal equipment 101, 102 and 103 may be various kinds of electronic equipment capable of supporting image storage and image processing, including but not limited to smart phones, tablet personal computers, e-book readers, laptop portable computers, desk computers, etc. When being software, the terminal equipment 101, 102 and 103 can be installed in the electronic equipment listed above. The terminal equipment may be implemented as multiple pieces of software or software modules (such as multiple pieces of software or software modules used for providing distributed service), may also be implemented as a single piece of software or software module, which is not limited herein.

The server 105 may be the one for providing various services, such as a backstage information processing server used for processing target statements uploaded by the terminal equipment 101, 102 and 103. The backstage information processing server can process obtained target statements to obtain a processing result (such as statement modification).

It needs to illustrate that the method for generating a modified statement is generally executed by the server 105; correspondingly, the device for generating a modified statement is generally disposed in the server 105.

It should be noted that the server may be hardware or software. When being hardware, the server may be implemented as a distributed server cluster including a plurality of servers, and may also be implemented as the single server. When being software, the server may be implemented as multiple pieces of software or software modules (such as multiple pieces of software or software modules used for providing distributed service), and may also be implemented as a single piece of software or software module, which is not limited herein.

It should be understood that numbers of the terminal equipment, the network and the server in FIG. 1 are exemplary only. Any number of terminal equipment, networks and servers may be provided according to implementation requirements.

Figure 2:
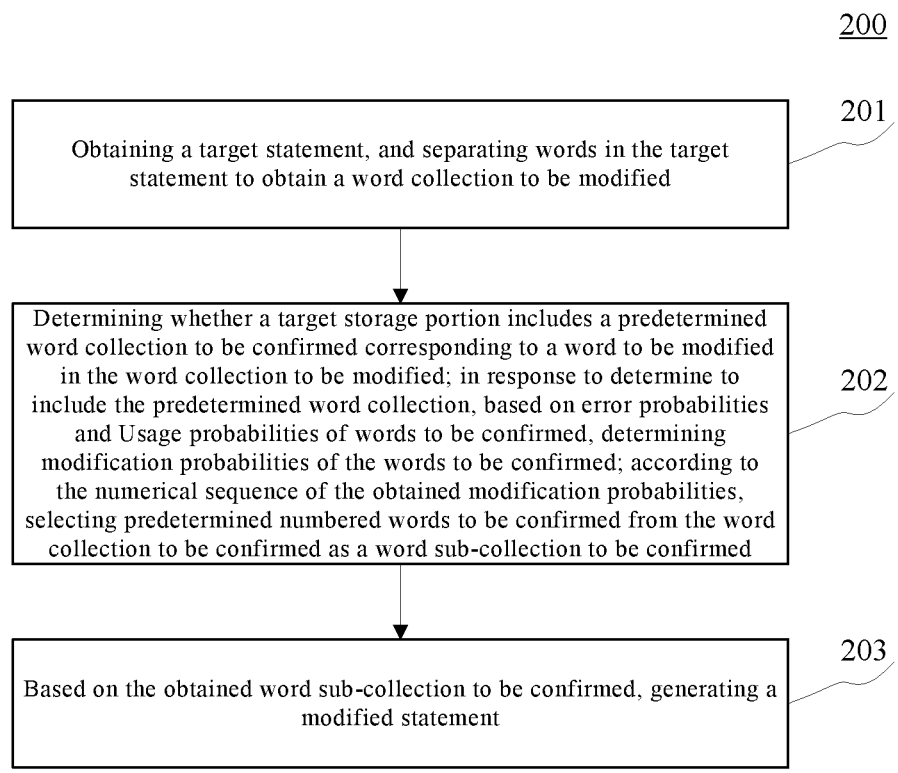
FIG. 2 is a flowchart of a method for generating a modified statement according to an embodiment of the disclosure.

Referring to FIG. 2, FIG. 2 shows a process 200 of a method for generating a modified statement according to an embodiment of the disclosure. The method for generating a modified statement includes following steps.

Step 201, a target statement is obtained and words in the target statement are separated to obtain a word collection to be modified.

In the embodiment, an executive body (as the server shown in FIG. 1) for generating a modified statement can obtain the target statement remotely in a wired connection manner or a wireless connection manner or locally. The target statement can be a statement with words to be separated; the target statement can be a statement input by a user utilizing a terminal device (such as the terminal device as shown in FIG. 1), and sent to the executive body above, or a statement pre-stored in the executive body above. As an example, the target statement can be a searching statement configured for searching information, or a statement pre-extracted from information such as an article or literal comments.

The executive body above can further separate words in the obtained target statement to obtain a word collection to be modified. Specifically, the executive body above can separate words in the target statement according to a conventional method of separating words (such as the forward maximum matching algorithm, the N-gram model method, the hidden Markov model, etc.) to obtain a word collection to be modified.

It needs to illustrate that the word collection to be modified can include all words obtained after separating words in the target statement, or include a portion of words in accordance with a predetermined condition. For instance, it can mark the part of speech of each word obtained by separating words in the target statement, and extract a word with a predetermined part of speech (i.e. noun and/or verb) from each word as a word to be modified. The method of marking the part of speech is the widely known technology extensively researched and applied at present, which will not be repeated herein.

Step 202, whether a target storage portion includes a predetermined word collection to be confirmed corresponding to words to be modified or not is determined; in response to determine to include the predetermined word collection, based on an error probability and a usage probability of the words to be confirmed, modification probabilities of the words to be confirmed are determined; according to the numerical sequence of the obtained modification probabilities, predetermined numbered of words to be confirmed are extracted from the word collection to be confirmed as a word sub-collection to be confirmed.

In the embodiment, the executive body above can execute following steps to the words to be modified in the word collection to be modified.

Step 2021, whether the target storage portion includes a predetermined word collection to be confirmed corresponding to the words to be modified.

The word to be confirmed has corresponding error probability and usage probability. The error probability corresponding to the word to be confirmed is configured for indicating a probability of incorrectly replacing the word to be confirmed by the word to be modified. As an example, it is supposed that an error probability corresponding to a word to be confirmed A is 10%, which can indicate a probability of the word to be confirmed misused as the word to be modified is 10%. The usage probability is configured for indicating a probability of using the word to be confirmed. Generally, the usage probability can be a probability of presenting the word to be confirmed obtained by word frequency statistics of a predetermined text in advance. The error probability can be a probability obtained by counting times of the word to be confirmed incorrectly replaced by the word to be modified in advance.

In some optional embodiments, the error probability and the usage probability of the word to be confirmed can be obtained by following steps in advance.

Following steps are executed to the words to be confirmed in the word collection to be confirmed.

Step one, the number of the words to be confirmed included in texts in a predetermined text sub-collection corresponding to the words to be confirmed is determined as a first number. The text sub-collection is a sub-collection of a predetermined text collection.

Step two, the number of the words to be modified corresponding to the words to be confirmed included in texts in the text sub-collection corresponding to the words to be confirmed is determined as a second number.

As an example, it is supposed that a word to be confirmed is "surnay", and the number of the word "surnay" included in all texts in the corresponding text sub-collection is the first number; a word to be modified corresponding to the word "surnay" is "suona", and the number of the word "suona" included in all texts in the text sub-collection is the second number. It needs to illustrate that the text sub-collection corresponding to the words to be confirmed can be a text sub-collection included in a text collection predetermined by a technician. For instance, the text collection is a pre-obtained collection of search statements input by a user. The text sub-collection corresponding to the words to be confirmed can be a collection of numerous search statements containing the words to be confirmed and numerous search statements containing the words to be modified corresponding to the words to be confirmed in the text collection.

Step three, the determined second number is divided by a total number of the first number and the second number to obtain an error probability of the word to be confirmed.

Continuing the forgoing example, it is supposed that the number of the word "suona" (the word to be modified) included in texts in the text sub-collection is 10, and the number of the word "surnay" (the word to be confirmed) included therein is 90. The error probability corresponding to the word "surnay" is 10/(10+90).

Step four, the number of the words to be confirmed in the text collection is determined as a third number, and a ratio of the determined third number to a total number of words included in texts in the text collection is determined as the usage probability of the word to be confirmed.

In the embodiment, the storage portion above can be a storage portion predisposed in the executive body, or a storage portion predisposed in an electronic device connected with the executive body above for communication. It needs to illustrate that the storage portion can be a practically physical storage portion (i.e. a storage portion in a disk or a chip), or a virtual storage portion (i.e. a table).

As an example, the target storage portion can include numerous words to be modified and numerous word collections to be confirmed. Each word to be modified can correspond to a word collection to be confirmed.

In some optional embodiments, the target storage portion is a pre-established correlation chart. The correlation chart includes words to be modified and the word collections to be confirmed. The correlation chart is configured for indicating a corresponding relation of the words to be modified and the word collection to be confirmed. The correlation chart further includes error probabilities and usage probabilities of the words to be confirmed. As an example, the correlation chart can be a two-dimensional chart. The chart can store numerous words to be modified. Each word to be modified corresponds to three rows (or three columns) in the two-dimensional chart. Each row (or each column) therein is configured for storing the word to be confirmed corresponding to the word to be modified, the error probability of the word to be confirmed and the usage probability of the word to be confirmed, respectively. It can correctly determine a word collection to be confirmed corresponding to the word to be modified by using the correlation chart, which can help to distinctly show the word to be confirmed and the corresponding word collection to be confirmed.

Step 2022, in response to determine to include the predetermined word collection, based on the error probability and the usage probability of the word to be confirmed, the modification probability of the word to be confirmed is determined.

The modification probability is configured for indicating a probability of the word to be modified revised as the word to be confirmed. Generally, the higher modification probability indicates the larger probability of the word to be modified to be incorrect, which can result in larger probability of revise the word to be modified as the word to be confirmed. As an example, the executive body above can calculate based on the Bayes formula to obtain the modification probability of the word to be confirmed. Specifically, the Bayes formula is:

$P(c|w)=P(w|c) \times P(c)/P(w)$, where c is configured for indicating a word to be confirmed; w is configured for indicating a word to be modified; $P(c)$ is a usage probability of the word to be confirmed; $P(w|c)$ is an error probability corresponding to the word to be confirmed c, which is the probability of the word to be confirmed c miswrote as the word to be modified w in the premise that the word to be confirmed c is correct; $P(w)$ is a usage probability of a word to be modified; $P(c|w)$ is a modification probability of the word to be confirmed c, which is a probability of the word to be modified w ought to be revised as the word to be confirmed c. $P(w)$ can be the probability obtained by statistics of words to be modified included in texts in the predetermined text collection. For instance, a ratio of the number of words to be modified to the total number of words included in texts in the text collection is determined as the usage probability of words to be modified.

As another example, as the usage probability $P(w)$ of a word to be modified is constant, $P(c|w)$ is directly proportional to $P(w|c) \times P(c)$ in the formula above. A formula of determining the modification probability of a word to be confirmed can be approximately as the following formula.

$$P(c|w)=P(w|c) \times P(c).$$

Step 2023, according to a numerical sequence of the obtained modification probabilities, predetermined numbered words to be confirmed are selected from the word collection to be confirmed as a word sub-collection to be confirmed.

As an example, the executive body above can select predetermined numbered words to be confirmed from the word collection to be confirmed according to a descending order of the modification probabilities. It needs to illustrate that the word collection to be confirmed can act as a word sub-collection corresponding to the words to be modified when the number of words to be confirmed included in the word collection to be confirmed is less than the predetermined number.

Step 203, based on the obtained word sub-collection to be confirmed, a modified statement is generated.

In the embodiment, the executive body above can generate a modified statement based on the obtained word sub-collection to be confirmed.

As an example, the executive body above can select words to be confirmed respectively from each word collection to be confirmed according to the descending order of modification probabilities; the selected words to be confirmed and words to be modified in the word collection to be modified without corresponding words to be confirmed are assembled to be a modified statement according to an arrangement sequence of words to be modified in the word collection to be modified.

In some optional embodiments, the executive body above can generate the modified statement according to following steps.

First, utilizing the obtained words to be confirmed in the word collection to be confirmed, at least one candidate modified statement is generated, and a confidence coefficient of the candidate modified statement in the at least one candidate modified statement is obtained. Specifically, the executive body above can utilize a conventional statement generation algorithm to generate at least one candidate modified statement. As an example, it is supposed to obtain a word collection to be modified after separating words in the target statement is "A B C D E"; a word sub-collection to be confirmed corresponding to the word to be modified B includes words to be confirmed "B1" and "B2"; a word sub-collection to be confirmed corresponding to the word to be modified E includes words to be confirmed "E1" and "E2"; the generated at least one candidate modified statement can include: "A B1 C D E1", "A B2 C D E1", "A B1 C D E2" and "A B1 C D E2".

The statement generation algorithm can include but not limited to at least one of the beam search algorithm, the greedy search algorithm and the Viterbi algorithm.

Generally, each candidate modified statement in the at least one candidate modified statement obtained by the forgoing statement generation algorithm can have a corresponding confidence coefficient. Specifically, the confidence coefficient can be a total number of probabilities of adjacent word pairs in words included in the candidate modified statement. The probability of adjacent words is configured for indicating a probability of two adjacent words to be correct words. The confidence coefficient is configured for indicating a probability of the candidate modified statement to be a correct statement. The higher confidence coefficient indicates the larger probability of the target statement obtained in step 201 revised as a candidate modified statement corresponding to the confidence coefficient. It needs to illustrate that the forgoing statement generation algorithm is the widely known technology extensively researched and applied at present, which will not be repeated herein.

Then, based on the numerical sequence of the obtained confidence coefficients, the candidate modified statement can be selected from at least one candidate modified statement as the modified statement. Specifically, the number of the modified statement can be at least one.

Optionally, the executive body above can further output the modified statement in various manners. For instance, the modified statement is displayed on a screen connected with the executive body above, or the modified statement is sent to a terminal device connected with the executive body above for display.

Figure 3:
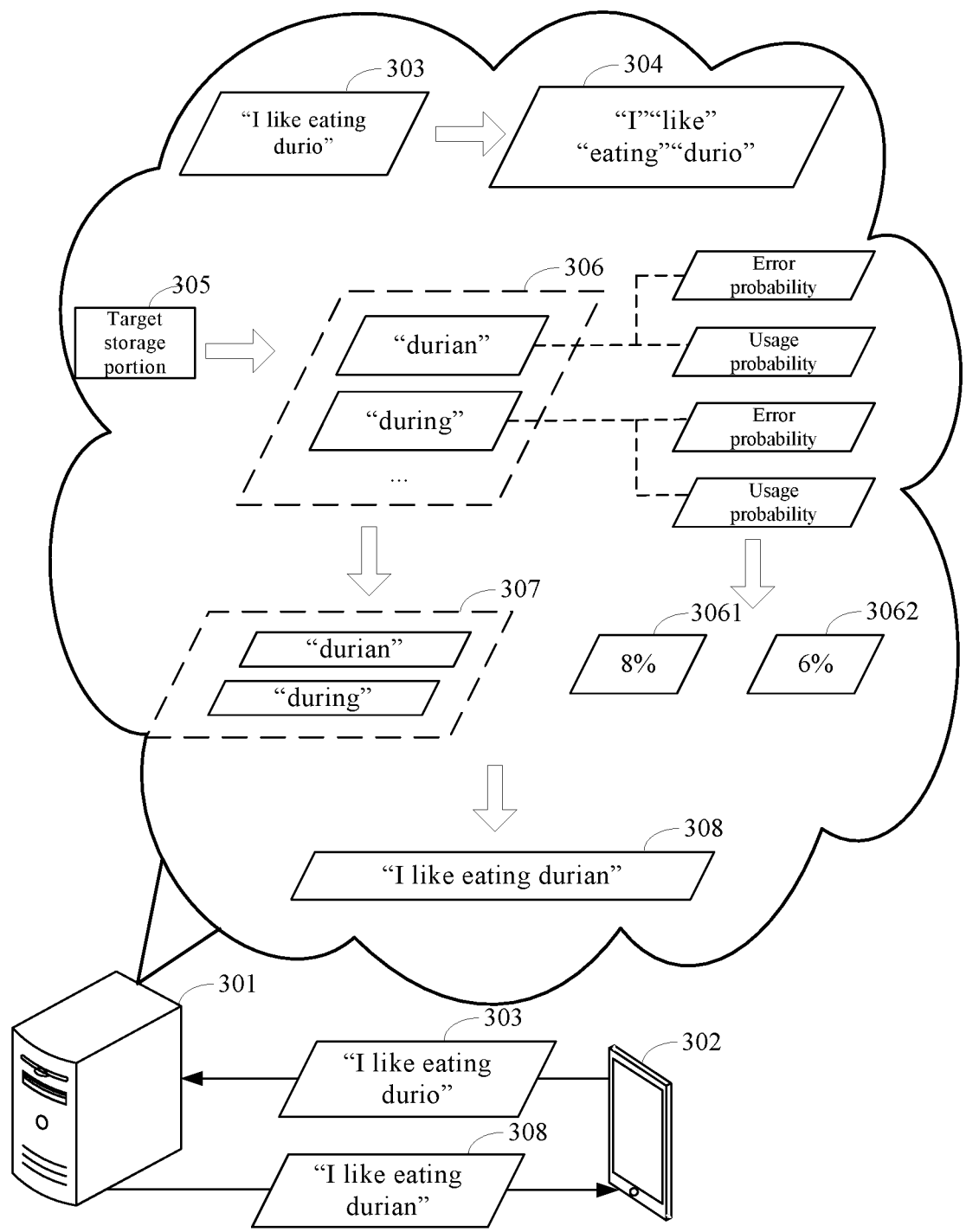
FIG. 3 is a schematic view of an application scenario of a method for generating a modified statement according to an embodiment of the disclosure.

Referring to FIG. 3, FIG. 3 is a schematic view of an application scenario of a method for generating a modified statement according to the embodiment. In the application scenario of FIG. 3, a server 301 first obtain a search statement input by a user utilizing a terminal device 302 as a target statement 303 (i.e. I like eating durio). Then, the server 301 separates words in the target statement 303 to obtain a word collection to be modified 304 (i.e. including "I", "like", "eating" and "durio"). Next, the server 301 determines the word "durio" has a corresponding word collection to be confirmed 306 (i.e. including "durian" and "during") in a target storage portion 305. The other words have no corresponding word collection to be modified. And then, the server 301 utilizes the Bayes formula and utilizes the error probabilities and the usage probabilities of the words to be confirmed to calculate the modification probability of each word to be confirmed (i.e. a modification probability 3061 of "durian" is 8%, and a modification probability 3062 of "during" is 6%). According to the numerical sequence of obtained modification probabilities, predetermined numbered (i.e. two) words to be confirmed are selected from the word collection to be confirmed 306 as a word sub-collection to be confirmed 307. Finally, the server 301 utilizes the beam research algorithm to generate a modified statement 308 (i.e. "I like eating durian"), and sends the modified statement 308 to the terminal device 302; then the terminal device 302 can display the modified statement 308.

The method provided by the forgoing embodiments of the disclosure obtains the word collection to be modified by separating words in the target statement, then determines a word collection to be confirmed corresponding to words to be modified in the word collection to be modified, then determines modification probabilities of the words to be confirmed based on the error probabilities and the usage probabilities of the words to be confirmed, and selects predetermined numbered words to be confirmed from the word collection to be confirmed according to the numerical sequence of the modification probabilities as a word sub-collection to be confirmed corresponding to the words to be modified, and finally generates a modified statement based on each of the obtained word sub-collections to be confirmed, which can improve the accuracy to modify the statement.

Figure 4:
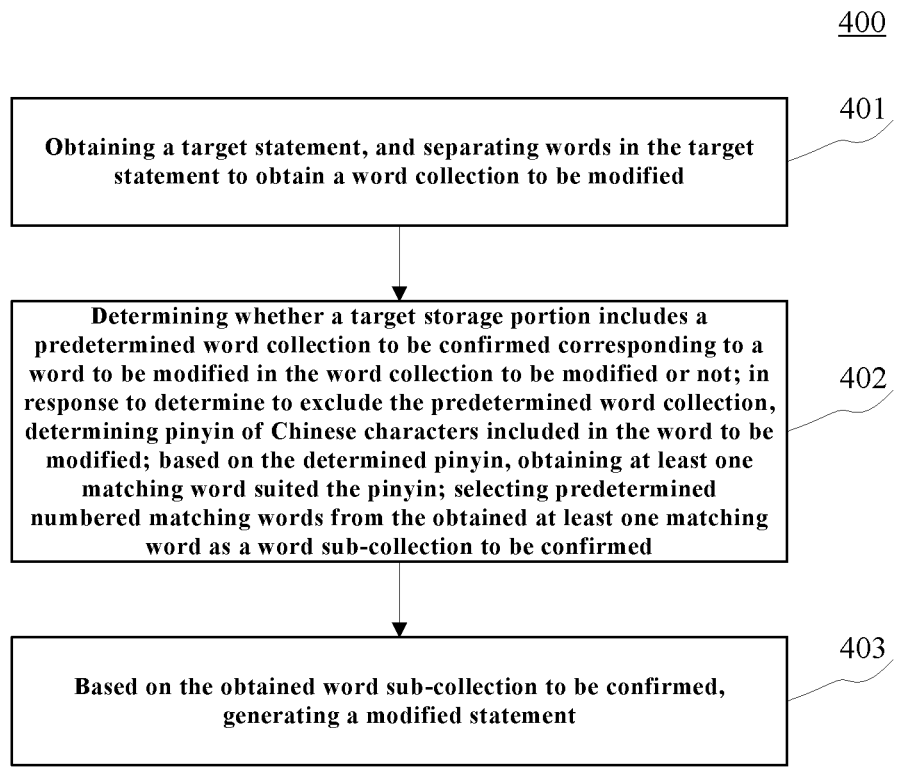
FIG. 4 is a flowchart of a method for generating a modified statement according to another embodiment of the disclosure.

Referring to FIG. 4, FIG. 4 is a process 400 of a method for generating a modified statement according to another embodiment. The process 400 of a method for generating a modified statement includes following steps.

Step 401, a target statement is obtained, and words in the target statement are separated to obtain a word collection to be modified.

In the embodiment, the step 401 is almost identical to the step 201 in the embodiment corresponding to FIG. 2, which will not be repeated herein.

Step 402, whether the target storage portion includes a predetermined word collection to be confirmed corresponding to words to be modified in the word collection to be modified or not is determined; in response to determine to exclude the predetermined word collection, pinyin of Chinese characters included in the words to be modified can be determined; based on the determined pinyin, at least one matching word suited the pinyin is obtained; predetermined numbered matching words are selected from the obtained at least one matching word as the word sub-collection to be confirmed.

In the embodiment, the executive body above can perform following steps to the words to be modified in the word collection to be modified.

Step 4021, whether the target storage portion includes a predetermined word collection to be confirmed corresponding to the words to be modified.

In the embodiment, the step 4021 is almost identical to the step 2021 in the embodiment corresponding to FIG. 2, which will not be repeated herein.

Step 4022, in response to determine the target storage portion excludes the predetermined word collection to be confirmed corresponding to the word to be modified, pinyin of Chinese characters included in the word to be modified can be determined.

In the embodiment, the executive body (i.e. the server as shown in FIG. 1) of the method for generating a modified statement can determine pinyin of Chinese characters included in the word to be modified in response to determine the target storage portion excludes the predetermined word collection to be confirmed corresponding to the word to be modified. For instance, a word to be modified is "bonesetting cream"; the target storage portion excludes a word collection to be confirmed corresponding to "bonesetting cream", and the pinyin "zheng gu gao" of the word to be modified is determined.

Step 4023, based on the determined pinyin, at least one matching word suited the pinyin is obtained.

In the embodiment, the executive body above can obtain at least one matching word suited the determined pinyin from a predetermined word bank. The predetermined word bank can be predisposed in the executive body above, or predisposed in an electronic device connected with the executive body above for communication. As an example, the word bank can include numerous words and pinyin of each word.

The matching word in the at least one selected matching word can be pinyin of included Chinese characters and words identical or similar to the determined pinyin. Specifically, the pinyin of the words to be modified can correspond to a predetermined pinyin collection. For instance, pinyin of the word to be modified is "zheng gu gao"; a corresponding pinyin collection can include "zhuang gu gao" and "zheng gu gao", and words whose pinyin is "zhuang gu gao" or "zheng gu gao" can be selected from the predetermined word bank as the matching word (i.e. at least one matching word includes "bone strengthening cream", "bone strengthening height", "bonesetting cream", etc.).

Step 4024, predetermined numbered matching words are selected from the obtained at least one matching word as a word sub-collection to be confirmed.

In the embodiment, the executive body above can select predetermined numbered matching words from the obtained at least one matching word according to various manners as the word sub-collection to be confirmed. For instance, it can randomly select predetermined numbered matching words from the at least one matching word as the word sub-collection to be confirmed.

In some optional embodiments, the matching word in the obtained at least one matching word has a corresponding hot value, and the hot value is configured for indicating a frequency to use a word. As an example, the hot value can be times of a user employing a word (i.e. employing the word for searching) within a given period (i.e. within the last month), or can be a ratio of the times of the user employing the word to a total number of the user employing words in a predetermined word collection within the given period (i.e. all words employed by the user within the given period).

Based on a hot value corresponding to the matching word, the executive body above can select predetermined numbered matching words from the obtained at least one matching word as the word sub-collection to be confirmed according to steps as follows.

According to the numerical sequence of hot values, predetermined numbered matching words are selected from the obtained at least one matching word as the word sub-collection to be confirmed. As an example, the executive body above can select predetermined numbered matching words from the obtained at least one matching word according to a descending order of hot values. Generally, the larger hot value indicates the higher frequency of the matching word to be used. Namely, the higher possibility of the matching word is a word which ought to replace the word to be modified.

As an example, it is supposed that the predetermined number is 2; in the at least one matching word, a hot value of the matching word "bone strengthening cream" is maximal, and a hot value of the matching word "bonesetting cream" is in the second place. A determined word sub-collection to be confirmed can include "bone strengthening cream" and "bonesetting cream".

Step 403, based on the obtained word sub-collection to be confirmed, a modified statement is generated.

In the embodiment, the step 403 is almost identical to the step 203 in the embodiment corresponding to FIG. 2, which will not be repeated herein.

It can be seen from FIG. 4 that the process 400 of the method for generating a modified statement in the embodiment underlines the steps of determining the word sub-collection to be confirmed under the condition of no word collection to be confirmed corresponding to the words to be modified included in the target storage portion compared with the embodiment corresponding to FIG. 2. Therefore, the scheme described in the embodiment can make the word sub-collection to be confirmed more comprehensive, which can further improve the accuracy to modify the statement.

Figure 5:
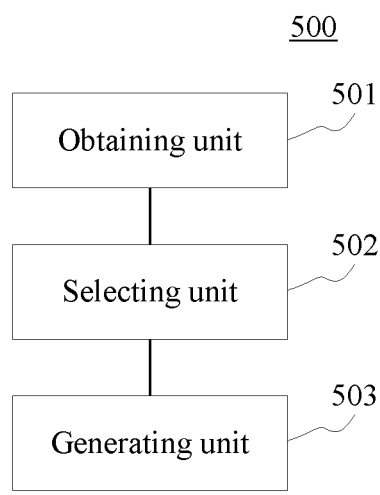
FIG. 5 is a structural schematic view of a device for generating a modified statement according to an embodiment of the disclosure.

Referring to FIG. 5, as the implement of the methods as shown in forgoing figures, the disclosure provides an embodiment of a device for generating a modified statement. The device embodiment is corresponding to the method embodiment shown as FIG. 2. The device specifically can be applied in various electronic devices.

As shown in FIG. 5, a device 500 for generating a modified statement of the embodiment includes: an obtaining unit 501, which is disposed to obtain a target statement, and separate words in the target statement to obtain a word collection to be modified; a selecting unit 502, which is disposed to determine whether a target storage portion comprises a predetermined word collection to be confirmed corresponding to a word to be modified in the word collection to be modified; wherein words to be confirmed have error probabilities and usage probabilities; the usage probabilities are configured for indicating probabilities of the words to be confirmed incorrectly replaced by the word to be modified; the usage probabilities are configured for indicating probabilities of using the words to be confirmed; in response to determine to comprise the predetermined word collection, based on the error probabilities and the usage probabilities of the words to be confirmed, determine modification probabilities of the words to be confirmed; wherein the modification probabilities are configured for indicating probabilities of revising the word to be modified as the words to be confirmed; according to a numerical sequence of the modification probabilities, select predetermined numbered words to be confirmed from the word collection to be confirmed as a word sub-collection to be confirmed; and a generating unit 503, which is disposed to generate the modified statement based on the word sub-collection to be confirmed.

In the embodiment, the obtaining unit 501 can obtain the target statement remotely or locally in a wired connection manner or a wireless connection manner. The target statement can be input by a user utilizing a terminal device (the terminal device as shown in FIG. 1), and sent to the device 500 above, or a statement pre-stored in the device 500 above. The obtaining unit 501 can further separate words in the obtained target statement to obtain a word collection to be modified. Specifically, the obtaining unit 501 above can further separate words in the target statement according to a conventional method for separating words (i.e. the forward maximum matching algorithm, the N-gram model method, the hidden Markov model, etc.) to obtain the word collection to be modified.

It needs to illustrate that the word collection to be modified can include all words obtained by separating words in the target statement, or include a section of words in accordance with a predetermined condition. For instance, it can mark the part of speech of each word obtained by separating words in the target statement, and extract a word with a predetermined part of speech (i.e. noun and/or verb) from each word as a word to be modified. The method of marking the part of speech is the widely known technology extensively researched and applied at present, which will not be repeated herein.

In the embodiment, the selecting unit 502 above can execute following steps to the words to be modified in the word collection to be modified.

Step 5021, whether the target storage portion includes a predetermined word collection to be confirmed corresponding to the words to be modified.

The word to be confirmed has corresponding error probability and usage probability. The error probability is configured for indicating a probability of incorrectly replacing the word to be confirmed by the word to be modified. As an example, it is supposed that an error probability corresponding to a word to be confirmed A is 10%, which can indicate a probability of the word to be modified misused is 10%, and the correct word is the word to be confirmed A. The usage probability is configured for indicating a probability of using the word to be confirmed. Generally, the usage probability can be a frequency of presenting the word to be confirmed obtained by word frequency statistics of a predetermined text in advance. The error probability can be a probability obtained by counting times of the word to be confirmed incorrectly replaced by the word to be modified in advance.

Step 5022, in response to determine to include the predetermined word collection, based on the error probability and the usage probability of the word to be confirmed, the modification probability of the word to be confirmed is determined.

The modification probability is configured for indicating a probability of the word to be modified revised as the word to be confirmed. Generally, the higher modification probability indicates the larger probability of the word to be modified to be incorrect, which can result in larger probability of revise the word to be modified as the word to be confirmed. As an example, the selecting unit 502 above can calculate based on the Bayes formula to obtain the modification probability of the word to be confirmed.

Step 5023, according to a numerical sequence of the obtained modification probabilities, predetermined numbered words to be confirmed are selected from the word collection to be confirmed as a word sub-collection to be confirmed.

As an example, the selecting unit 502 above can select predetermined numbered words to be confirmed from the word collection to be confirmed according to a descending order of the modification probabilities. It needs to illustrate that the word collection to be confirmed can act as a word sub-collection corresponding to the words to be modified when the number of words to be confirmed included in the word collection to be confirmed is less than the predetermined number.

In the embodiment, the generating unit 503 can generate the modified statement based on the obtained word collection to be confirmed.

As an example, the generating unit 503 above can select words to be confirmed respectively from each word collection to be confirmed according to the descending order of modification probabilities. The selected words to be confirmed and words to be modified in the word collection to be modified without corresponding words to be confirmed are assembled to be a modified statement.

In some optional embodiments, the target storage portion is a pre-established correlation chart; the pre-established correlation chart comprises the word to be modified and the word collection to be confirmed; the pre-established correlation chart is configured for indicating a corresponding relation of the word to be modified and the word collection to be confirmed; the correlation chart further comprises the error probabilities and the usage probabilities of the words to be confirmed.

In some optional embodiments, the error probabilities and the usage probabilities of the words to be confirmed are pre-obtained according to following steps of: with respect to a word to be confirmed in the word collection to be confirmed, determining a quantity of the word to be confirmed comprised in texts in a predetermined text sub-collection corresponding to the word to be confirmed as a first number; wherein the text sub-collection is a sub-collection of a predetermined text collection; determining a quantity of the word to be modified corresponding to the word to be confirmed comprised in the texts in the predetermined text sub-collection corresponding to the word to be confirmed as a second number; dividing the second number by a sum of the first number and the second number to obtain an error probability of the word to be confirmed; determining a quantity of the word to be confirmed in the predetermined text collection as a third number; and determining a ratio of the third number to a total number of words comprised in the texts in the predetermined text collection as a usage probability of the word to be confirmed.

In some optional embodiments, the generating unit 503 can include a generating module (not shown in figures), which is disposed to utilize the words to be confirmed in the word sub-collection to be confirmed, generate at least one candidate modified statement, and obtain confidence coefficients of candidate modified statements in the at least one candidate modified statement; and a selecting module (not shown in figures), which is disposed to select a candidate modified statement from the at least one modified statement as the modified statement based on a numerical sequence of the confidence coefficients.

In some optional embodiments, the selecting unit 502 can include: a determining module (not shown in figures), which is disposed to determine pinyin of Chinese characters comprised in the word to be modified in response to determine that the target storage portion excludes the predetermined word collection to be confirmed corresponding to the word to be modified; an obtaining module (not shown in figures), which is disposed to obtain at least one matching word suited the pinyin based on the pinyin; and a selecting module (not shown in figures), which is disposed to select predetermined numbered matching words from the at least one matching word as the word sub-collection to be confirmed.

In some optional embodiments, a matching word in the at least one matching word has a corresponding hot value; the hot value is configured for indicating a frequency of using the matching word; and the selecting module is further disposed to: according to a numerical sequence of hot values, select the predetermined numbered matching words from the at least one matching word as the word sub-collection to be confirmed.

The device provided by the forgoing embodiments of the disclosure obtains the word collection to be modified by separating words in the target statement, then determines a word collection to be confirmed corresponding to words to be modified in the word collection to be modified, then determines modification probabilities of the words to be confirmed based on the error probabilities and the usage probabilities of the words to be confirmed, and selects predetermined numbered words to be confirmed from the word collection to be confirmed according to the numerical sequence of the modification probabilities as a word sub-collection to be confirmed corresponding to the words to be modified, and finally generates a modified statement based on each of the obtained word sub-collections to be confirmed, which can improve the accuracy to modify the statement.

Figure 6:
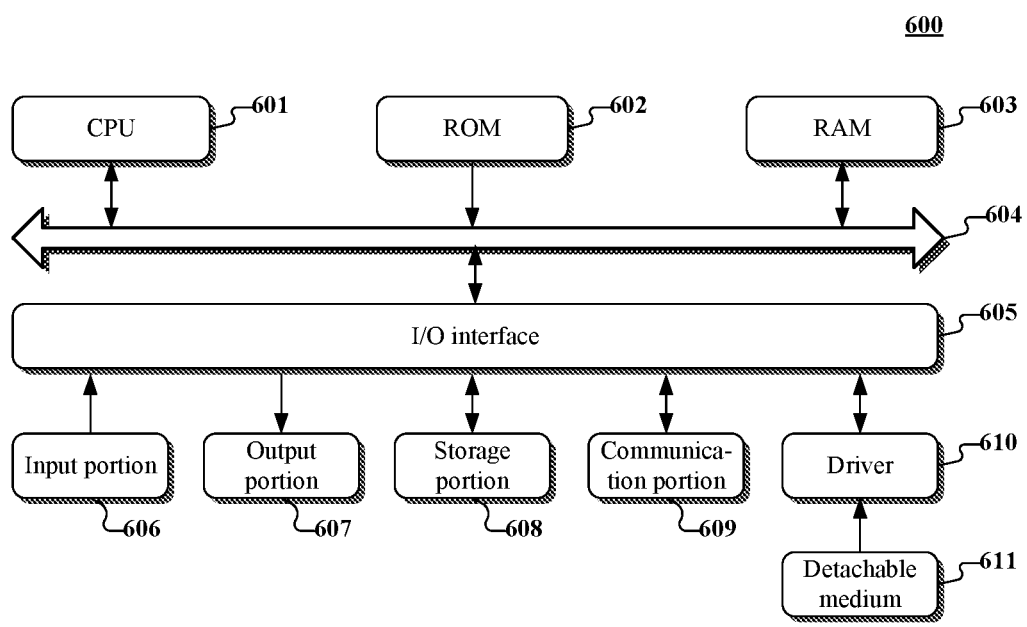
FIG. 6 is a structural schematic view of a computer system for implementing an electronic device adapted for an embodiment of the disclosure.

Reference is now made to FIG. 6 which shows a structure diagram of a computer system 600 of electronic equipment applicable to implementing an embodiment of the present application. The electronic equipment shown in FIG. 6 is merely an example and should not pose any limitation on functions and application ranges of the embodiments of the present application.

As shown in FIG. 6, the computer system 600 includes a central processing unit (CPU) 601 which can execute various appropriate actions and processes according to programs stored in a read-only memory (ROM) 602 or programs loaded to a random-access memory (RAM) 603 from a storage portion 608. Various programs and data required by operation of the system 600 are also stored in the RAM 603. The CPU 601, ROM 602 and RAM 603 are connected to one another through a bus 604. An input/output (I/O) interface 605 is also connected to the bus 604.

The I/O interface 605 is connected with following components: an input portion 606 including a keyboard, a mouse, etc.; an output portion 607 including a cathode-ray tube (CRT), a liquid crystal display (LCD), a loudspeaker, etc.; a storage portion 608 including a hard disk, etc.; and a communication portion 609 including a network interface card such as an LAN card and a modem. The communication portion 609 executes communication through networks such as the Internet. A driver 610 is also connected to the I/O interface 605 as required. A detachable medium 611, such as a magnetic disk, an optical disk, a magneto-optical disk and a semiconductor memory, is installed on the driver 610 as required, so that computer programs read from the detachable medium can be installed into the storage portion 608 as required.

Specifically, processes described above with reference to flowcharts may be implemented as computer software programs in accordance with embodiments of the present disclosure. For example, an embodiment of the present application comprises a computer program product which comprises a computer program carried on a computer readable medium, and the computer program comprises program codes used for executing the method shown in the flowchart. In such embodiment, the computer program may be downloaded from the network through the communication portion 609 and installed, and/or downloaded from the detachable medium 611 and installed. When the computer program is executed by the central processing unit (CPU) 601, a function defined in the method provided by the present application is executed.

It should be noted that the computer readable medium of the present application may be a computer readable signal medium or a computer readable storage medium, or any combination of the computer readable signal medium or the computer readable storage medium. The computer readable storage medium may be, for example, but is not limited to, an electronic, magnetic, optical, electromagnetic, infrared, or semiconductor system, apparatus, or device, or combination of any of the above. More specifically, the computer readable storage medium may include, but is not limited to, an electrical connector having one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of the above. In the present application, the computer readable storage medium may be any tangible medium that contains or stores a program that can be used by or in combination with an instruction execution system, apparatus, or device. In the present application, a computer readable signal medium may include a data signal propagating in a baseband or as a part of a carrier wave, and computer readable program codes are carried in the data signal. Such propagated data signal may be in various forms, including but not limited to an electromagnetic signal, an optical signal, or any appropriate combination of the above. The computer readable signal medium may also be any computer readable medium other than the computer readable storage medium, and the computer readable medium can transmit, propagate, or transport the program used by or in combination with the instruction execution system, apparatus, or device. The program codes included in the computer readable medium may be transmitted via any appropriate medium, including but not limited to wireless, electrical wires, optical cables, RF, etc., or any appropriate combination of the above.

The computer program codes for carrying out operation of the present application may be written by one or more programming languages, or a combination thereof, the programming languages include object oriented programming languages, such as Java, Smalltalk, C++, as well as conventional procedural programming languages, such as a "C" language or similar programming languages. The program codes may be executed entirely on a user computer, or partly on the user computer, or as a separate software package, or partly on the user computer and partly on a remote computer, or entirely on the remote computer or the server. In situations involving the remote computer, the remote computer may be connected to the user computer through any kind of network, including a local area network (LAN) or a wide area network (WAN), or may be connected to an external computer (for example through the Internet by virtue of an Internet service provider).

The flowcharts and block diagrams in the figures illustrate the possible system architecture, functions, and operation of systems, methods, and computer program products according to various embodiments of the present application. In view of this, each block in the flowcharts or block diagrams may represent a module, a program segment, or a portion of codes, and the module, the program segment or the portion of codes contains one or more executable instructions for implementing specified logical functions. It should also be noted that in some alternative implementations, the functions labeled in the blocks may be implemented according to an order different from the order labeled in the figures. For example, the two blocks shown in succession may, in fact, be executed substantially concurrently, or may sometimes be executed in a reverse order, depending upon the functions involved. It should also be noted that each block in the block diagrams and/or flowcharts, and combinations of blocks in the block diagrams and/or flowcharts can be implemented by dedicated hardware-based systems used for carrying out the specified functions or operation, or can be implemented by combinations of dedicated hardware and computer instructions.

Units described in the embodiments of the present application may be implemented in a software mode or in a hardware mode. The described units may also be arranged in a processor, for example, the units can be described as follows: a processor includes an obtaining unit, a selecting unit, and a generating unit, and the names of the units do not, in some cases, constitute limitation on the units themselves. For instance, the obtaining unit can further be described as a unit for obtaining a target statement, and separating words in the target statement to obtain a word collection to be modified.

In another aspect, the present application also provides a computer readable medium which may be included in the electronic equipment described in the above embodiments, or may also present separately without being assembled into the electronic device. The above computer readable medium carries one or more programs. When one or more programs above are executed by the electronic device, the electronic device is enabled to obtain a target statement, and separate words in the target statement to obtain a word collection to be modified; determine whether a target storage portion comprises a predetermined word collection to be confirmed corresponding to a word to be modified in the word collection to be modified; words to be confirmed have error probabilities and usage probabilities; the usage probabilities are configured for indicating probabilities of the words to be confirmed incorrectly replaced by the word to be modified; the usage probabilities are configured for indicating probabilities of using the words to be confirmed; in response to determine to comprise the predetermined word collection, based on the error probabilities and the usage probabilities of the words to be confirmed, determining modification probabilities of the words to be confirmed; the modification probabilities are configured for indicating probabilities of revising the word to be modified as the words to be confirmed; according to a numerical sequence of the modification probabilities, selecting predetermined numbered words to be confirmed from the word collection to be confirmed as a word sub-collection to be confirmed; and based on the word sub-collection to be confirmed, generating the modified statement.

The above description is merely the illustration of preferred embodiments of the present application and the technical principles used. It should be understood by those skilled in the art that the scope of the present application referred to herein is not limited to technical solutions formed by specific combinations of the above technical features, but also contains other technical solutions formed by any combination of the above technical features or equivalent features thereof without departing from the above inventive concept, such as, technical solutions formed by interchanging the above features with (but not limited to) the technical features with similar functions disclosed in the present application.

What is claimed is:

1. A method for generating a modified statement, comprising:
    obtaining a target statement, and separating words in the target statement to obtain a word collection to be modified;
    determining whether a target storage portion comprises a predetermined word collection to be confirmed corresponding to a word to be modified in the word collection to be modified; wherein words to be confirmed have error probabilities and usage probabilities; the error probabilities are configured for indicating probabilities of the words to be confirmed incorrectly replaced by the word to be modified; the usage probabilities are configured for indicating probabilities of using the words to be confirmed;
    in response to determining that the target storage portion comprises the predetermined word collection, based on the error probabilities and the usage probabilities of the words to be confirmed, determining modification probabilities of the words to be confirmed; wherein the modification probabilities are configured for indicating probabilities of revising the word to be modified as the words to be confirmed;
    according to a numerical sequence of the modification probabilities, selecting predetermined numbered words to be confirmed from the word collection to be confirmed as a word sub-collection to be confirmed; and
    based on the word sub-collection to be confirmed, generating the modified statement.

2. The method according to claim 1, wherein the target storage portion is a pre-established correlation chart; the pre-established correlation chart comprises the word to be modified and the word collection to be confirmed; the pre-established correlation chart is configured for indicating a corresponding relation of the word to be modified and the word collection to be confirmed; the correlation chart further comprises the error probabilities and the usage probabilities of the words to be confirmed.

3. The method according to claim 1, wherein the error probabilities and the usage probabilities of the words to be confirmed are pre-obtained according to following steps of:
    with respect to a word to be confirmed in the word collection to be confirmed, determining a quantity of the word to be confirmed comprised in texts in a predetermined text sub-collection corresponding to the word to be confirmed as a first number; wherein the text sub-collection is a sub-collection of a predetermined text collection; determining a quantity of the word to be modified corresponding to the word to be confirmed comprised in the texts in the predetermined text sub-collection corresponding to the word to be confirmed as a second number; dividing the second number by a sum of the first number and the second number to obtain an error probability of the word to be confirmed; determining a quantity of the word to be confirmed in the predetermined text collection as a third number; and determining a ratio of the third number to a total number of words comprised in the texts in the predetermined text collection as a usage probability of the word to be confirmed.

4. The method according to claim 1, wherein the based on the word subcollection to be confirmed, generating the modified statement comprises:
    utilizing the words to be confirmed in the word sub-collection to be confirmed, generating at least one candidate modified statement, and obtaining confidence coefficients of candidate modified statements in the at least one candidate modified statement; and
    based on a numerical sequence of the confidence coefficients, selecting a candidate modified statement from the at least one modified statement as the modified statement.

5. The method according to claim 1, wherein after determining whether a target storage portion comprises a predetermined word collection to be confirmed corresponding to a word to be modified in the word collection to be modified, the method further comprises:

in response to determine that the target storage portion excludes the predetermined word collection to be confirmed corresponding to the word to be modified, determining pinyin of Chinese characters comprised in the word to be modified;

based on the pinyin, obtaining at least one matching word suited the pinyin; and selecting predetermined numbered matching words from the at least one matching word as the word sub-collection to be confirmed.

6. The method according to claim 5, wherein a matching word in the at least one matching word has a corresponding hot value; the hot value is configured for indicating a frequency of using the matching word; and wherein the selecting predetermined numbered matching words from the at least one matching word as the word sub-collection to be confirmed comprises:

according to a numerical sequence of hot values, selecting the predetermined numbered matching words from the at least one matching word as the word sub-collection to be confirmed.

7. A device for generating a modified statement, comprising at least one processor; and at least one memory communicatively coupled to the at least one processor and storing instructions that upon execution by the at least one processor cause the device to:

obtain a target statement, and separate words in the target statement to obtain a word collection to be modified;

determine whether a target storage portion comprises a predetermined word collection to be confirmed corresponding to a word to be modified in the word collection to be modified; wherein words to be confirmed have error probabilities and usage probabilities; the error probabilities are configured for indicating probabilities of the words to be confirmed incorrectly replaced by the word to be modified; the usage probabilities are configured for indicating probabilities of using the words to be confirmed;

in response to determining that the target storage portion comprises the predetermined word collection, based on the error probabilities and the usage probabilities of the words to be confirmed, determine modification probabilities of the words to be confirmed; wherein the modification probabilities are configured for indicating probabilities of revising the word to be modified as the words to be confirmed; according to a numerical sequence of the modification probabilities, select predetermined numbered words to be confirmed from the word collection to be confirmed as a word sub-collection to be confirmed; and generate the modified statement based on the word sub-collection to be confirmed.

8. The device according to claim 7, wherein the target storage portion is a pre-established correlation chart; the pre-established correlation chart comprises the word to be modified and the word collection to be confirmed; the pre-established correlation chart is configured for indicating a corresponding relation of the word to be modified and the word collection to be confirmed; the correlation chart further comprises the error probabilities and the usage probabilities of the words to be confirmed.

9. The device according to claim 7, wherein the error probabilities and the usage probabilities of the words to be confirmed are pre-obtained according to following steps of:

with respect to a word to be confirmed in the word collection to be confirmed, determining a quantity of the word to be confirmed comprised in texts in a predetermined text sub-collection corresponding to the word to be confirmed as a first number; wherein the text sub-collection is a sub-collection of a predetermined text collection; determining a quantity of the word to be modified corresponding to the word to be confirmed comprised in the texts in the predetermined text sub-collection corresponding to the word to be confirmed as a second number; dividing the second number by a sum of the first number and the second number to obtain an error probability of the word to be confirmed; determining a quantity of the word to be confirmed in the predetermined text collection as a third number; and determining a ratio of the third number to a total number of words comprised in the texts in the predetermined text collection as a usage probability of the word to be confirmed.

10. The device according to claim 7, wherein the at least one memory further stores instructions that upon execution by the at least one processor cause the device to:

utilize the words to be confirmed in the word sub-collection to be confirmed, generate at least one candidate modified statement, and obtain confidence coefficients of candidate modified statements in the at least one candidate modified statement; and select a candidate modified statement from the at least one modified statement as the modified statement based on a numerical sequence of the confidence coefficients.

11. The device according to claim 7, wherein at least one memory further stores instructions that upon execution by the at least one processor cause the device to:

determine pinyin of Chinese characters comprised in the word to be modified in response to determine that the target storage portion excludes the predetermined word collection to be confirmed corresponding to the word to be modified;

obtain at least one matching word suited the pinyin based on the pinyin; and select predetermined numbered matching words from the at least one matching word as the word sub-collection to be confirmed.

12. The device according to claim 11, wherein a matching word in the at least one matching word has a corresponding hot value; the hot value is configured for indicating a frequency of using the matching word; and wherein the at least one memory further stores instructions that upon execution by the at least one processor further cause the device to:

according to a sequence of hot values, select the predetermined numbered matching words from the at least one matching word as the word sub-collection to be confirmed.

13. A non-transitory computer readable medium, stored with a computer program therein, wherein the computer program is executed by a processor to perform a method for generating a modified statement comprising:

obtaining a target statement, and separating words in the target statement to obtain a word collection to be modified;

determining whether a target storage portion comprises a predetermined word collection to be confirmed corresponding to a word to be modified in the word collection to be modified; wherein words to be confirmed have error probabilities and usage probabilities; the error probabilities are configured for indicating probabilities of the words to be confirmed incorrectly replaced by the word to be modified; the usage probabilities are configured for indicating probabilities of using the words to be confirmed;

in response to determining that the target storage portion comprises the predetermined word collection, based on the error probabilities and the usage probabilities of the words to be confirmed, determining modification probabilities of the words to be confirmed; wherein the modification probabilities are configured for indicating probabilities of revising the word to be modified as the words to be confirmed; according to a numerical sequence of the modification probabilities, selecting predetermined numbered words to be confirmed from the word collection to be confirmed as a word sub-collection to be confirmed; and based on the word sub-collection to be confirmed, generating the modified statement.

14. The device according to claim 8, wherein the at least one memory further stores instructions that upon execution by the at least one processor cause the device to:

determine pinyin of Chinese characters comprised in the word to be modified in response to determine that the target storage portion excludes the predetermined word collection to be confirmed corresponding to the word to be modified;

obtain at least one matching word suited the pinyin based on the pinyin; and select predetermined numbered matching words from the at least one matching word as the word sub-collection to be confirmed.

15. The device according to claim 9, wherein the at least one memory further stores instructions that upon execution by the at least one processor cause the device to:

determine pinyin of Chinese characters comprised in the word to be modified in response to determine that the target storage portion excludes the predetermined word collection to be confirmed corresponding to the word to be modified;

obtain at least one matching word suited the pinyin based on the pinyin; and select predetermined numbered matching words from the at least one matching word as the word sub-collection to be confirmed.

16. The non-transitory computer readable medium according to claim 13, wherein the target storage portion is a pre-established correlation chart; the pre-established correlation chart comprises the word to be modified and the word collection to be confirmed; the pre-established correlation chart is configured for indicating a corresponding relation of the word to be modified and the word collection to be confirmed; the correlation chart further comprises the error probabilities and the usage probabilities of the words to be confirmed.

17. The non-transitory computer readable medium according to claim 13, wherein the error probabilities and the usage probabilities of the words to be confirmed are pre-obtained according to following steps of:

with respect to a word to be confirmed in the word collection to be confirmed, determining a quantity of the word to be confirmed comprised in texts in a predetermined text sub-collection corresponding to the word to be confirmed as a first number; wherein the text sub-collection is a sub-collection of a predetermined text collection; determining a quantity of the word to be modified corresponding to the word to be confirmed comprised in the texts in the predetermined text sub-collection corresponding to the word to be confirmed as a second number; dividing the second number by a sum of the first number and the second number to obtain an error probability of the word to be confirmed; determining a quantity of the word to be confirmed in the predetermined text collection as a third number; and determining a ratio of the third number to a total number of words comprised in the texts in the predetermined text collection as a usage probability of the word to be confirmed.

18. The non-transitory computer readable medium according to claim 13, wherein the based on the word sub-collection to be confirmed, generating the modified statement comprises:

utilizing the words to be confirmed in the word sub-collection to be confirmed, generating at least one candidate modified statement, and obtaining confidence coefficients of candidate modified statements in the at least one candidate modified statement; and based on a numerical sequence of the confidence coefficients, selecting a candidate modified statement from the at least one modified statement as the modified statement.

19. The non-transitory computer readable medium according to claim 13, wherein after determining whether a target storage portion comprises a predetermined word collection to be confirmed corresponding to a word to be modified in the word collection to be modified, the method further comprises:

in response to determine that the target storage portion excludes the predetermined word collection to be confirmed corresponding to the word to be modified, determining pinyin of Chinese characters comprised in the word to be modified;

based on the pinyin, obtaining at least one matching word suited the pinyin; and selecting predetermined numbered matching words from the at least one matching word as the word sub-collection to be confirmed.

20. The non-transitory computer readable medium according to claim 19, wherein a matching word in the at least one matching word has a corresponding hot value; the hot value is configured for indicating a frequency of using the matching word; and wherein the selecting predetermined numbered matching words from the at least one matching word as the word sub-collection to be confirmed comprises:

according to a numerical sequence of hot values, selecting the predetermined numbered matching words from the at least one matching word as the word sub-collection to be confirmed.

* * * * *